2,812,232
PREVENTION OF SCALE FORMATION IN URANIUM SOLVENT EXTRACTOR

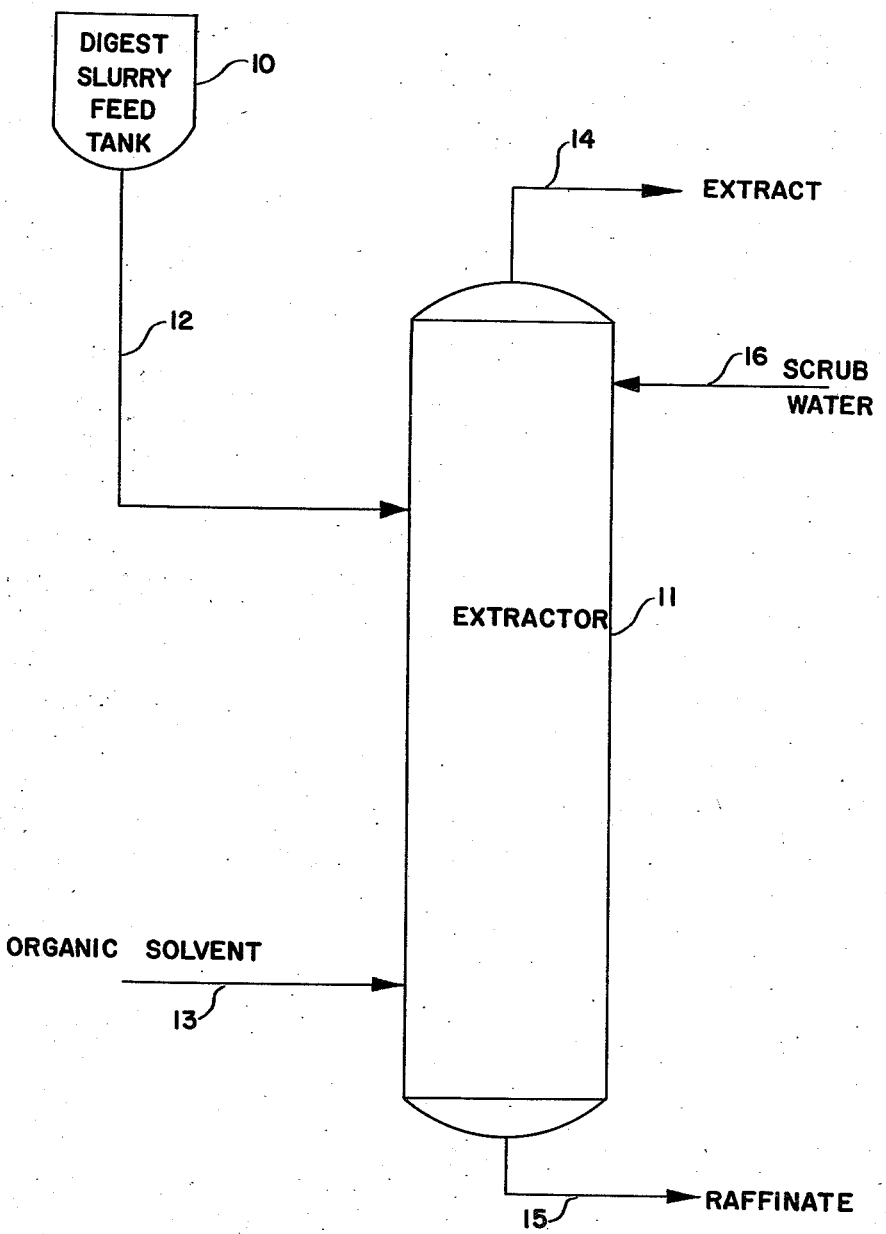

John W. Delaplaine, Philadelphia, Pa., assignor, by mesne assignments, to the United States of America as represented by the United States Atomic Energy Commission Application November 16, 1953, Serial No. 392,530

9 Claims. (Cl. 23—14.5)

The present invention relates to a method for preventing scale formation in uranium solvent extraction equipment, and more particularly scale formation caused by the precipitation of silica and calcium and lead sulfates.

In the recovery of uranium from natural ores containing the same, the usual procedure is to digest the ore with nitric acid to produce an aqueous acid slurry. The slurry, for instance one obtained by digestion of pitchblende, will contain in addition to salts of uranium, salts of calcium, lead, barium and generally also some salts of various other metals. Uranium is separated from the slurry by a procedure involving selective extraction, usually by means of mixed organic solvents. Although not limited thereto, one form of apparatus largely employed for such extraction is a pulse column.

One of the major difficulties encountered in solvent extraction processes employed in the production of uranium metal from ores containing lead, calcium and various sulfides is the large amount of scale formation that occurs in the extraction equipment, especially inside the solvent extraction column. This scale formation is the cause of frequent equipment shutdowns for clean-out purposes.

The principal components of this scale were found to be silica, calcium sulfate and lead sulfate. Silica appears to precipitate gradually from the aqueous feed material charged to the extraction equipment, and it is concluded that the feed material is supersaturated with silica when fed to the extraction system. Calcium sulfate and lead sulfate, on the other hand, appear to precipitate as uranyl nitrate is extracted from the aqueous feed material by the organic solvent. Barium and radium sulfates also appear to precipitate from solution together with the lead and calcium sulfates. The resulting scale is difficult to remove from the interiors and internals of the extraction equipment and is extremely radioactive.

It is an object of the present invention to provide an effective method for preventing scale formation on the interior walls and internal members of solvent extraction equipment while employed for the selective solvent extraction of uranium from aqueous feed materials.

Other objects will become apparent from a reading of the following description of a particular embodiment of the invention, which is given with reference to the accompanying drawing, illustrating the extraction process schematically by flow diagram.

Digest slurry, such as that produced by the nitric acid digestion of pitchblende ore, is continuously withdrawn from feed tank 10, and is fed to extractor column 11 through line 12 at an intermediate level, preferably at or above the middle of the column. The feed slurry may contain up to 300 grams per liter of uranium, zero to 100 grams per liter of sulfate, and zero to 10 grams per liter each of such metals as calcium, lead and barium.

While the slurry is being fed to extractor 11, an organic solvent such as one consisting of about 22.5 volume percent tributyl phosphate and about 77.5 volume percent kerosene is continuously fed into extractor 11, near the bottom thereof, through line 13 at a predetermined rate. Any other solvent that is not attacked by $HNO_3$ and has satisfactory uranium over impurity separation properties, can be used. For a slurry having a concentration of about 200 grams uranium per liter, the ratio of organic solvent to feed slurry may be about 3 to 1.

Extractor 11 is provided with a series of plates, or other known slurry-liquid contacting devices, by means of which the organic solvent stream, as it rises from the bottom of extractor 11 to the top thereof, is caused to be intimately contacted with both the liquid and solids components of the digest slurry stream as it gradually descends from the top to the bottom of extractor 11.

A continuous countercurrent solvent extraction takes place in extractor 11, and substantially all of the uranyl nitrate is extracted directly from both the liquid and solids components of the digest slurry by the organic solvent. The organic extract, containing the uranyl nitrate, largely in the form of a uranyl nitrate-tributyl phosphate complex, is continuously withdrawn from the top of extractor 11 through line 14, and is introduced into a scrubber (not shown) where it is scrubbed with water to remove very small amounts of residual impurities, and processed by any suitable known method to produce an aqueous uranyl nitrate product. The used water produced in this scrubbing operation is called "scrub water." A stream of raffinate slurry, substantially free of uranium, is continuously withdrawn from the bottom of column 11 through line 15.

In previous known methods, as the uranyl nitrate is extracted from the aqueous phase by the organic solvent in extractor 11, calcium, lead, radium and barium sulfates precipitate and tend to deposit as scale on the interior surfaces of extractor 11 and interconnecting piping. This scale is very difficult to remove, and is extremely radioactive.

Scale formation in extractor 11 is prevented in the method of the present invention by (1) preventing supersaturation of the feed slurry with silica and metal sulfates, (2) controlling the concentration of uranyl nitrate in the feed slurry at or above about 200 grams per liter by proper control of digestion conditions, (3) controlling the concentration of uranyl nitrate in the organic phase leaving extractor 11 at about 65 to about 95 percent and preferably about 70 to about 80 percent of the saturation value, (4) controlling the nitric acid concentration in the aqueous feed material and the acid gradient in the aqueous phase at it proceeds through extractor 11, and (5) by diluting the slurry inside the column with an aqueous diluent such as scrub water.

By way of explanation, if the solubility of a chemical compound decreases in a solution which was originally saturated, the solution becomes supersaturated and scaling may occur. Whether or not scaling does occur is determined by the degree of supersaturation and the rate of precipitation, which is relatively low.

In the uranium-nitric acid system, the solubilities of calcium sulfate, lead sulfate and similar materials are fairly high because of the presence of the nitrate ion in solution. This ion originates not only with the nitric acid but also with uranyl nitrate. In the extractor uranyl nitrate is removed from the aqueous solution and supplied to the organic solution. This causes the solubility of calcium sulfate and lead sulfate and similar materials to decrease, because of the removal of the salting-in effect of the uranyl nitrate. Since uranium is removed continuously as the slurry passes downward through the column, the solubility of these salts also decreases continuously.

If the feed solution to the column is originally saturated or slightly supersaturated with calcium sulfate or lead sulfate, some technique must be utilized to offset this decreased solubility of the salts. If, however, the feed solution is unsaturated, the removal of the salting-in material may never cause the solution to become supersaturated. If the feed solution is high in calcium and low in lead only a few of the above proposed techniques may be required. For example, with a feed unsaturated in lead sulfate, it may not be necessary to add nitric acid to the organic solvent to produce a high nitric acid concentration gradient in the extractor. This is so because the slurry will not become supersaturated with lead sulfate at any point in the column. If, however, the feed solution is saturated with lead sulfate, acidulation of the organic solvent is required.

The method of the present invention presents the combination of techniques required for increasing the solubility of the calcium or lead sulfate materials, or decreasing the concentration of the ions themselves so that the solubilities of these salts will not be exceeded. This combination of techniques has been developed for a feed saturated in both calcium sulfate and lead sulfate. Dilution of the calcium, lead and sulfate ions is brought about by the introduction of any suitable diluting material. The amount of dilution required, if the aqueous wash product from the scrub column is used for dilution purposes, is determined by a complete material balance around both the extraction column and the scrub column. It is desirable to utilize an aqueous slurry feed rich in uranium because the material balance for about 80 percent uranium saturation of the organic phase equals a value such that the aqueous phase in the extraction column is never supersaturated with calcium or lead sulfate.

Supersaturation of the feed slurry with silica and metal sulfates is prevented as follows. Th feed slurry is preheated to a temperature of about 150° to 250° F., preferably about 200° F. The hot slurry is then cooled to atmospheric temperature in tank 10, or in a separate vessel, while it is continuously stirred to promote crystallization and precipitation of the dissolved silica and metal sulfates. Supersaturation of the feed slurry with silica and metal sulfates is prevented in the cooled feed slurry by this operation. Since the solubilities of the silica and metal sulfates in the feed slurry decrease with increasing temperature, a maximum amount of silica and metal sulfates is precipitated from the feed slurry, and a minimum amount of dissolved silica and metal sulfates enters extractor 11 in the feed slurry. In instances where the silica and calcium and lead sulfate contents of the feed are relatively low, the foregoing step may be omitted.

The concentration of uranyl nitrate in the feed is maintained above about 200 grams per liter by controlling digestion conditions. For a concentrated uranium ore this is a relatively simple matter. The concentration can be obtained by digestion with 50 to 60 percent nitric acid. For a dilute uranium ore more concentrated acid, or concentration by boildown may be required.

The concentration of uranyl nitrate in the organic extract is controlled at a desired level below the saturation point by controlling the organic to aqueous volumetric ratio in the column. Thus the product concentration of uranium in the extract is set by a material balance on the extraction system, as pointed out above, and the preferred concentration is about 70 to about 80 percent of saturation.

Control of the nitric acid concentration in the aqueous or raffinate phase, as it proceeds through extractor 11, is highly desirable to reduce the scaling tendency of the raffinate phase during the solvent extraction operation. It has been found desirable to increase the nitric acid concentration as the aqueous phase descends from the top to the bottom of column 11. It has also been discovered that the desired nitric acid concentration in the aqueous phase should be about 3.0 to 3.5 normal at the supply level of the slurry. This concentration is preferably achieved by continuously saturating the organic solvent with nitric acid while the organic solvent is continuously charged to column 11 through line 13.

Dilution of the aqueous phase is accomplished by continuously introducing water or dilute nitric acid into the top of extractor 11 through line 16 at predetermined rates to dilute the feed slurry within the column. The dilute nitric acid used for this dilution operation can be aqueous "scrub water" obtained as described above from a scrubber (not shown). This scrub liquid may contain about 100 to 200 grams nitric acid per liter and about 50 to about 200 grams per liter of uranium as uranyl nitrate. The composition of the scrub water used depends upon the temperature of the scrubbing operation, the composition of the organic extract, and the ratio of organic phase to aqueous phase in the scrub column. The amount of water or acid-water added to the feed slurry is preferably about 30 percent by volume of the slurry.

In the feed slurry charged to extractor 11, calcium, lead, radium, and barium sulfates are retained in solution, i. e., salted in by uranium nitrate and by nitric acid dissolved in the feed. As the uranyl nitrate is extracted from the feed slurry by the organic solvent in column 11, these dissolved sulfates may exceed their solubility limits and, unless suitable preventive measures are taken, the sulfates deposit as scale on the interior surfaces in extractor 11.

For efficient operation, it is desirable to charge a feed slurry to extractor 11 which has a maximum uranyl nitrate concentration. In addition, it is desirable to maintain the uranyl nitrate concentration above about 200 grams uranium per liter to minimize scaling tendencies. The free nitric acid concentration is maintained at about 3.0 to 3.5 normal in the aqueous phase at the supply level in extractor 11 because at higher nitric acid concentrations lead sulfate is precipitated. This precipitation occurs because of the high concentrations of $Pb^{++}$ ion and $SO_4^=$ ion in the feed slurry charged to extractor 11. In other words, the precipitating effect of uranyl nitrate removal on lead sulfate is higher at higher nitric acid normalities. At nitric acid concentrations below 3.0 normal, on the other hand, calcium sulfate is precipitated because of the extremely large decreases in the solubility of calcium sulfate as uranyl nitrate is extracted from the aqueous phase in extractor 11 by the organic solvent. At a 3.0 to 3.5 normal nitric acid concentration in the aqueous phase, the change in the solubility of calcium sulfate for a given decrease in the uranyl nitrate concentration in the aqueous phase, is much less than at nitric acid concentrations below about 3.0 normal.

In the known previously used process, the scaling tendency of the feed slurry is reduced by the addition thereto of a barium salt solution to precipitate sulfate as $BaSO_4$, and reduce the $SO_4^=$ ion concentration to the point where the solubilities of the other dissolved metal sulfates are not greatly exceeded. The disadvantages of this method are: (1) high chemicals cost; (2) considerable scaling occurs in spite of the barium addition; and (3) high cost of filtration equipment to remove the precipitated sulfates.

In the method of the present invention, dilution takes place in the top of column 11 by the normal recirculation of scrub water, as pointed out above. Thus, the concentrations of the dissolved metal sulfates entering column 11 is unaffected prior to charging the feed slurry to extractor 11.

The ionic concentrations in the aqueous feed, e. g., of calcium and sulfate, are decreased by the dilution mentioned above in proportion to the amount of this dilution. For example, a 30 percent dilution with scrub water reduces the product of these two concentrations to (0.7) (0.7) or 49 percent of the original value. Consequently, up to a 51 percent reduction in the solubility product of calcium sulfate due to the precipitating effect of uranium removal can be tolerated. In the method of the present invention, as applied to feed materials saturated or supersaturated with calcium, lead and sulfate ions, control of the feed composition, level of saturation, preheating conditions and acidity of the solvent are maintained at such values that the solubility product constants of the dissolved sulfates are never exceeded in the system. If the uranium concentration in the feed drops below about 200 grams per liter of uranium, and the feed contains enough dissolved calcium or lead sulfate to saturate it, the decrease in the solubility products in the aqueous phase in column 11 will be greater than about 50 percent and precipitation may occur.

In actual practice, the amount of aqueous phase dilution required in column 11 is a function of the amount of scrub water used, the degree of uranium saturation achieved in the organic solvent leaving extractor column 11, and the uranium content of the feed charged to column 11. The metal sulfate dilution achieved in the aqueous phase is proportional to the volume of scrub water used per volume of slurry feed. A fixed ratio of scrub water to organic extract is required in a particular application of the process to obtain the desired purification of the organic extract in the scrub column. The metal sulfate dilution obtained in practice is proportional to the volume of organic extract produced per volume of slurry feed employed. Since the uranium is essentially completely extracted from the feed the weight rate of uranium entering the column must equal the weight rate of uranium leaving the column. Thus, for a given uranium saturation of the organic extract, the volume of organic extract per volume of feed, and hence the aqueous phase dilution is directly proportional to the concentration of uranium in the slurry feed. Similarly, for a given uranium concentration in the feed, the lower the organic extract uranium concentration is below the saturation value, the greater the aqueous phase dilution achieved. However, high uranium saturation is required in the organic extract phase for the desired product purity. Therefore, a balance is struck at about 65 to about 95 percent and preferably about 70 to about 80 percent uranium saturation in the organic extract.

Scaling is reduced in the method of the invention by increasing the acid concentration of the aqueous phase passing from the top to the bottom of column 11. This increase is obtained by acidifying the organic solvent entering column 11 through line 13. As uranium is extracted from the aqueous feed by the organic phase, the nitric acid is forced out of the organic phase. This occurs because the amount of tributyl phosphate in the organic solvent is insufficient to complex or associate with both uranyl nitrate and nitric acid, and complexes preferentially with the uranyl nitrate. By saturating the organic phase entering column 11 with nitric acid, or partially saturating it at a level of about 70 to about 80 percent, and running at a uranium saturation of about 75 to 80 percent in the aqueous feed to column 11, the acid concentration of the aqueous product or raffinate withdrawn from column 11, through line 15, can be made to be higher in nitric acid concentration by about 1.0 to 1.5 normal than the nitric acid concentration of the aqueous feed. The beneficial effect on lead sulfate is shown in the table below:

| Acid Concentration at bottom of column (Normality) | Solubility Product of PbSO₄ at bottom of column (grams/liter) |
|---|---|
| 3.5 | 5.5 |
| 4.5 | 13 |
| 5.0 | 16 |

The required increase of nitric acid is also a function of the concentration of uranium in the aqueous phase or the percent of saturation of the uranium in the exit aqueous phase or raffinate. The higher the uranium concentration, the greater the acid concentration in the raffinate. As stated previously, the percent saturation is balanced by all considerations at about 75 to 80 percent in the aqueous phase.

Scaling can also be reduced by adding ferric nitrate to the scrub water. This increases the solubility of the dissolved sulfates substantially and prevents their precipitation. Calgon (sodium hexametaphosphate) may also be added to minimize sulfate deposition. The use of either of these expedients is expensive, and is not necessary if the factors presented in the description above are controlled within the proper limits.

Obviously there are other applications and modifications of the method of the present invention than those mentioned above. It is to be understood, therefore, that the scope of this invention is to be determined only as required by the following claims when construed in the light of the prior art.

What is claimed is:

1. A method of preventing scale formation during selective solvent extraction of uranyl nitrate from an aqueous feed material which comprises preheating the feed material to a temperature in the range of about 150° to 250° F., cooling the hot feed material to atmospheric temperature while continuously agitating the slurry to promote crystallization and precipitation of silica and metal salts, controlling the uranium concentration of the feed material above about 200 grams per liter, charging the feed material into an extraction zone into intimate contact with an organic selective solvent, adjusting the concentration of uranyl nitrate in the organic phase discharging from the extraction zone to about 65 to about 95 percent of the saturation value by controlling the organic to aqueous phase ratio in the extraction zone, and maintaining an increasing nitric acid concentration gradient in the aqueous phase in the extraction zone by partially saturating the organic selective solvent entering said zone with nitric acid at a level of about 70 to about 80%.

2. A method of preventing scale formation during selective solvent extraction of uranyl nitrate from an aqueous feed material which comprises preheating the feed material to a temperature in the range of about 150° to 250° F., cooling the hot feed material to atmospheric temperature while continuously agitating the slurry to promote crystallization and precipitation of silica and metal salts, controlling the uranium concentration of the feed material above about 200 grams per liter, controlling the nitric acid concentration of said feed material at about 3.0 to 3.5 normal, charging the feed material into an extraction zone into intimate contact with an organic selective solvent, adjusting the concentration of uranyl nitrate in the organic phase discharging from the extraction zone to about 65 to about 95 percent of the saturation value by controlling the organic to aqueous phase ratio in the extraction zone, and maintaining an increasing nitric acid concentration gradient in the aqueous phase in the extraction zone by saturating the organic selective solvent with nitric acid at a level of about 70 to about 80 percent.

3. A method of preventing scale formation during selective solvent extraction of uranyl nitrate from an aqueous feed material which comprises preheating the feed material to a temperature in the range of about 150° to 250° F., cooling the hot feed material to atmospheric temperature while continuously agitating the slurry to promote crystallization and precipitation of silica and metal salts, controlling the uranium concentration of the feed material above about 200 grams per liter, charging the feed material into an extraction zone into initimate contact with an organic selective solvent, adjusting the concentration of uranyl nitrate in the organic phase discharging from the extraction zone to about 65 to about 95 percent of the saturation value by controlling the organic to aqueous phase ratio in the extraction zone, and maintaining the nitric acid concentration in the aqueous phase discharging from the extraction zone greater by 1.0 to 1.5 normal than the nitric acid concentration of the aqueous feed material by saturating the organic selective solvent entering said zone with nitric acid at a level of about 70 to 80%.

4. A method of preventing scale formation during continuous selective solvent extraction of uranyl nitrate from an aqueous feed material which comprises preheating the feed material to a temperature in the range of about 150° to 250° F., cooling the hot feed material to atmospheric temperature while continuously agitating the slurry to promote crystallization and precipitation of silica and metal sulfates, continuously controlling the uranium concentration of the feed material above about 200 grams per liter, continuously charging the feed material into a continuous solvent extraction column for intimate contracting with an organic selective solvent, continuously maintaining the concentration of uranyl nitrate in the organic phase discharging from the extraction column at about 70 to about 80 percent of the uranyl nitrate saturation value by controlling the organic to aqueous phase volumetric ratio in the extraction column, continuously diluting the aqueous phase inside the extraction column with an aqueous diluent, and maintaining a nitric acid concentration gradient in the aqueous phase in the extraction column by adding nitric acid to the organic solvent charged to the extraction column to saturate said solvent with said acid.

5. A method of preventing scale formation during continuous selective solvent extraction of uranyl nitrate from an aqueous feed material which comprises forming a nitric acid digest slurry by the nitric acid digestion of pitchblende ore, preheating the feed material to a temperature in the range of about 150° to 250° F., cooling the hot feed material to atmospheric temperature while continuously agitating the slurry to promote crystallization and precipitation of silica and metal sulfates, continueously controlling the uranium concentration of the feed material above about 200 grams per liter, continuously charging the feed material into a continuous solvent extraction column for intimate contacting with an organic selective solvent, continuously maintaining the concentration of uranyl nitrate in the organic phase discharging from the extraction column at about 70 to about 80 percent of the uranyl nitrate saturation value by controlling the organic to aqueous phase volumetric ratio in the extraction column, continuously diluting the aqueous phase inside the extraction column with an aqueous diluent, and maintaining a nitric acid concentration gradient in the aqueous phase in the extraction column by adding nitric acid to the organic solvent charged to the extraction column to saturate said solvent with said acid.

6. A method of preventing scale formation during continuous selective solvent extraction of uranyl nitrate from an aqueous feed material which comprises preheating the feed material to a temperature in the range of about 150° to 250° F., cooling the hot feed material to atmospheric temperature while continuously agitating the slurry to promote crystallization and precipitation of silica and metal sulfates, continuously controlling the uranium concentration of the feed material above about 200 grams per liter, continuously charging the feed material into a continuous solvent extraction column for intimate contacting with an organic selective solvent consisting of about 22.5 volume percent tributyl phosphate and about 77.5 volume percent kerosene, continuously maintaining the concentration of uranyl nitrate in the organic phase discharging from the extraction column at about 70 to about 80 percent of the uranyl nitrate saturation value by controlling the organic to aqueous phase volumetric ratio in the extraction column, continuously diluting the aqueous phase inside the extraction column with an aqueous diluent, and maintaining a nitric acid concentration gradient in the aqueous phase in the extraction column by adding nitric acid to the organic solvent charged to the extraction column to saturate said solvent with said acid.

7. A method of preventing scale formation during continuous selective solvent extraction of uranyl nitrate from an aqueous feed material which comprises perheating the feed material to a temperature in the range of about 150° to 250° F. cooling the hot feed material to atmospheric temperature while continuously agitating the slurry to promote crystallization and precipitation of silica and metal sulfates, continuously controlling the uranium concentration of the feed material above about 200 grams per liter, continuously charging the feed material into a continuous solvent extraction column for intimate contacting with an organic selective solvent, controlling the nitric acid concentration of the aqueous phase at the feed level in the extraction column at about 3.0 to 3.5 normal, continuously maintaining the concentration of uranyl nitrate in the organic phase discharging from the extraction column at about 70 to about 80 percent of the uranyl nitrate saturation value by controlling the organic to aqueous phase volumetric ratio in the extraction column, continuously diluting the aqueous phase inside the extraction column with an aqueous diluent and maintaining a nitric acid concentration gradient in the aqueous phase in the extraction column by adding nitric acid to the organic solvent charged to the extraction column to saturate said solvent with said acid.

8. A method of preventing scale formation during continuous selective solvent extraction of uranyl nitrate from an aqueous feed material which comprises producing a nitric acid digest slurry by the nitric acid digestion of pitchblende ore, preheating this feed material to a temperature in the range of about 150° to 250° F., cooling the hot feed material to atmospheric temperature while continuously agitating the slurry to promote crystallization and precipitation of silica and metal sulfates, continuously controlling the uranium concentration of the feed material above about 200 grams per liter, continuously charging the feed material into a continuous solvent extraction column for intimate contacting with an organic selective solvent, said solvent consisting of about 22.5 volume percent tributyl phosphate and about 77.5 volume percent kerosene, continuously maintaining the concentration of uranyl nitrate in the organic phase discharging from the extraction column at about 70 to about 80 percent of the uranyl nitrate saturation value by controlling the organic to aqueous phase volumetric ratio in the extraction column, continuously diluting the aqueous phase inside the extraction column with an aqueous diluent, and maintaining a nitric acid concentration gradient in the aqueous phase in the extraction column by adding nitric acid to the organic solvent charged to the extraction column to saturate said solvent with said acid.

9. A method of preventing scale formation during continuous countercurrent selective solvent extraction of uranyl nitrate from an aqueous feed material which comprises preheating the aqueous feed material to a temperature below its boiling point, cooling to atmospheric temperature while agitating the feed material to promote crystallization and precipitation of silica and metal sulfates therein, feeding the aqueous feed material into an extraction column at a level above the middle of the column, continuously introducing an organic selective solvent into said column near the bottom thereof, continuously discharging a uranium-rich extract from the column near the top thereof, continuously discharging a raffinate substantially free of uranium from the column near the bottom thereof, introducing scrub water from a scrubbing operation of the uranium-rich extract into the column at a level above that of the aqueous feed introduction, introducing nitric acid into the column at the level of introduction of the organic selective solvent, continuously maintaining the concentration of nitric acid in the organic phase near the bottom of the column at about 70 to about 80 percent of the saturation value, maintaining the nitric acid concentration in the aqueous phase at about 3.0 to 3.5 normal at the level of aqueous feed introduction into the column, and maintaining the nitric acid concentration in the aqueous phase near the bottom of the column at 1.0 to 1.5 normal above that of the aqueous phase at the level of aqueous feed material introduction.

References Cited in the file of this patent

UNITED STATES PATENTS 2,227,833   Hixson et al. _____ Jan. 7, 1941